G. H. PETRI.
FORMING MACHINE.
APPLICATION FILED AUG. 13, 1909.
1,087,051.
Patented Feb. 10, 1914.
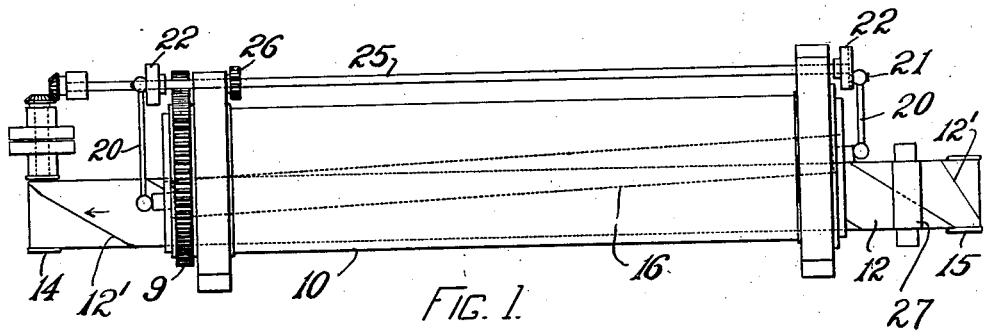
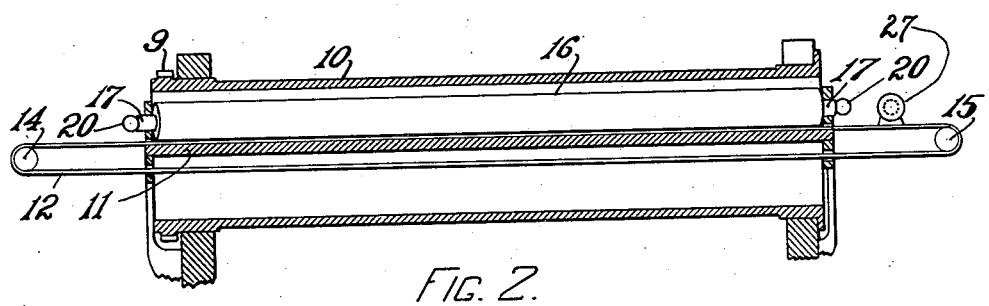
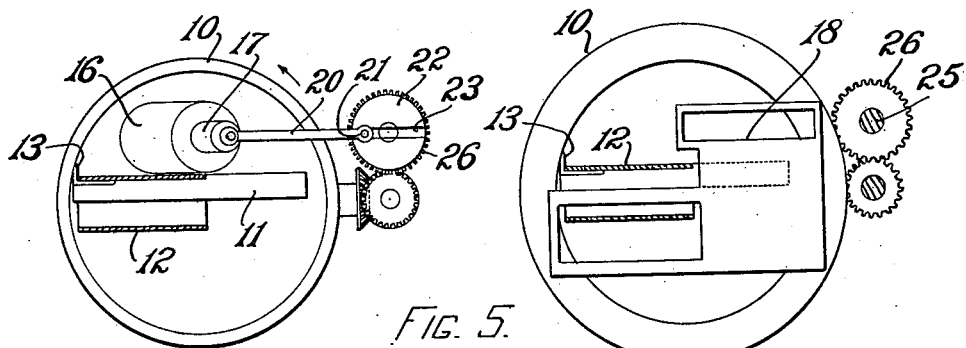
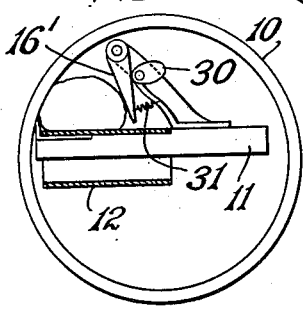
WITNESSES
Joseph T. Brennan
H. M. Walsh
INVENTOR
GUNTHER H. PETRI
BY HIS ATTORNEYS
Mitchell, Chadwick
& Kent

UNITED STATES PATENT OFFICE.

GUNTHER H. PETRI, OF BOSTON, MASSACHUSETTS.

FORMING-MACHINE.

1,087,051.

Specification of Letters Patent.

Patented Feb. 10, 1914.

Application filed August 13, 1909. Serial No. 512,742.

*To all whom it may concern:*

Be it known that I, GUNTHER H. PETRI, a citizen of the United States, residing at Boston, in the county of Suffolk and State of Massachusetts, have invented new and useful Improvements in Forming-Machines, of which the following is a specification.

This invention relates to improvements in forming machines.

More particularly it relates to an improved mechanism for "rounding up" masses of dough into balls, or forms somewhat resembling balls, suitable for proofing and molding.

The objects of the invention are to improve upon devices heretofore known for this purpose by providing a mechanism which is suitable for masses of different sizes, and which is simple in construction and in operation and easy to adjust to different sizes of dough. In the mechanism described a conveyer carries the dough through a hollow rotating cylinder in close contact and parallel with its interior surface and the dough is acted upon by said surface, said conveyer, and by other elements hereinafter described.

The accompanying drawings illustrate an embodiment of the invention, in which,

Figure 1 is a plan of apparatus embodying the invention; Fig. 2 is a side elevation with half the drum broken away; Fig. 3 is an end elevation with part of the mechanism at the end removed; Fig. 4 is an end elevation showing the removed mechanism; and Fig. 5 is an end elevation similar to Fig. 3 representing a modification.

Referring to the drawings, 10 designates a long hollow cylinder, or other concave rotating surface the interior of which forms a molding surface adapted to act upon the material. This rests in suitable bearings and is driven by gears 9. Within this cylinder, and preferably in one of the upper quadrants thereof, as shown in the end elevation, is a plate 11 whose flat upper surface sustains a conveyer belt 12 adjacent to the rotating surface. From the edge of this plate a flange 13 projects upward and bears on the interior of the cylinder 10 forming a scraper. The belt is endless, and arranged parallel to the adjacent surface of the cylinder, passing over guide rolls 14, 15, one at each end of the cylinder, one of which, 14, is provided with driving means, consisting of gearing or other device by which the belt is positively driven in the direction indicated by the arrow.

A device is provided to coöperate with the belt and the cylinder, which is shown in two forms. The preferred form, shown in Figs. 1, 2, 3 and 4, consists of a roller 16 set with its axis approximately parallel to the plane of the belt, but at an angle with respect to the axis of the cylinder, so that a gradually contracting space is formed between this roller and the portion of the cylinder surface in the quadrant above the belt. The direction of motion of the belt is from the wider to the narrower portion of this space. The roller has hubs 17 projecting at each end. Standards with platens or planes forming bearings 18 on which these hubs may roll are provided at each end of the cylinder. A pin in the end of each hub carries loosely one end of a connecting rod 20 the other end of which is attached to a crank pin 21 projecting from a disk 22 which has a diametrical slot 23 in which the said crank pin 21 is adjustable, and in which it may be clamped by a nut, as shown in the drawing. The duplicates of this device, one at each end of the cylinder are driven by a shaft 25 which connects them, and is itself driven by gear 26. Rotation of this shaft causes the eccentric or crank pin to revolve and pushes the hubs inward and outward on their platens. This causes the roller 16 to be thrust toward and from the cylinder wall over the belt, causing an alternate contraction and expansion of the space in which dough may pass. Incidentally, the surface of the roller, when the roller goes in, is rolling or rotating downward on the side toward the dough. The surface of the cylinder interior is also moving downward, and consequently the surface of a mass of dough caught between them is somewhat kneaded. When the roller moves outward its surface near the dough rises, thus stimulating rotation of the dough about an axis somewhat near the axis of the cylinder in direction. The combination with these of the movement of the conveyer belt longitudinally of the axis produces a composite rotation of such mass of dough; and as a result, the mass is gradually formed into a round or, more accurately speaking, a somewhat pear shaped form, and is finally discharged from the narrow end of the contracting throat or passage between roller and cylinder. To accommodate dough masses of different sizes, it is only necessary to adjust the eccentric to a suitable throw, so that it will drive the roller 16 to the required degree of approach to the cylinder surface to force the dough surely into contact therewith. The scraper 13 prevents the mass from being carried by the cylinder down past the edge of the belt. This scraper is preferably made of material which furnishes a slightly flexible spring blade; and the cylinder or drum is made of glass. By this combination apparatus is obtained which has many advantages in construction and in operation. In manufacture, the natural glaze which comes on the surface eliminates the necessity of going over the interior of the cylinder with a surfacing tool or grinder to give a smooth surface. The flexibility of the scraper enables it to clean the glass surface, notwithstanding such slight variations as occur therein. The hardness of the glass prevents its being worn by the hard spring steel; and the drum surface is immune from the rust which is apt to follow upon frequent cleaning operations where steel cylinders are used, as heretofore; and in operation the glass is found to produce a smoother surface on the dough, because the dough does not adhere to the glass as it does to steel. In addition to this, the transparency of the glass enables the progress of the work to be watched so that suitable adjustments of the parts can be made according to the work in hand; and in particular, the angle of the axis of the roll 16 with respect to the axis of the drum can thus be properly adjusted to give a suitable degree of compression intermittently to the dough. This is accomplished by setting one of the crank pins 21 at a greater degree of eccentricity than the other, as clearly shown in Fig. 1. In connection with this feature an auxiliary roll 27 may be used, which is arranged over the conveyer just before it passes into the drum and flattens each mass of dough under it, so that it will be broadened to a degree and engaged at the very outset by the roller 16, acting as a pusher, and pushed against the drum. The degree of stretching applied by roller 16 to the dough mass can be varied by substituting hubs of different size, where the roller rolls in its bearing platens, thus varying the number of revolutions the roller makes for each thrust it receives from the eccentric.

Fig. 5 shows a modification in which a reciprocating plate 16′ is used, actuated by a cam 30 and spring 31 in place of the reciprocating roller 16.

The belt 12 may have ridges 12′ if desired which tend to keep the masses of dough close against the cylinder.

I claim:—

1. Apparatus for forming plastic material, comprising a rotating hollow drum; a conveyer moving longitudinally within it having a continuous surface adapted to support a mass of dough adjacent to one side of the drum; means adapted to push a mass thereon against said adjacent side of the drum.

2. Apparatus for forming plastic material comprising a rotating hollow drum; a conveyer moving longitudinally through the drum; and means to push a mass on the conveyer against the downward moving side of the drum.

3. Apparatus for forming plastic material comprising a rotating hollow drum, a conveyer moving longitudinally through the drum, and adapted to carry a mass of dough and a pusher reciprocating above and over the surface of the conveyer toward and from the line where the conveyer and the drum-side are adjacent.

4. Apparatus for forming plastic material comprising a rotating hollow drum, a conveyer moving longitudinally through the drum and a pusher reciprocating over the conveyer toward and from the line where the conveyer and the drum-side are adjacent; said pusher comprising a roller and there being means whereby the roller rotates as it moves toward said drum-side.

5. Apparatus for forming plastic material comprising a rotating hollow drum, a conveyer moving longitudinally through the drum and a pusher reciprocating over the conveyer toward and from the line where the conveyer and the drum-side are adjacent; said pusher comprising a roller and there being a surface on which it rolls to and fro; the part rolling thereon having a smaller circumference than its said part over the conveyer.

6. Apparatus for forming plastic material comprising a rotating hollow drum, a conveyer moving longitudinally through the drum; a roller supported adjacent to the conveyer, there being a supporting surface on which the roller rolls, driving means reciprocating toward and from the side of the drum, and a rod connecting it with the roller and pivoted at the axis of the roller, whereby said roller rolls reciprocatively over said surface.

7. The combination of a rotating hollow drum, a stiff plate fixed within it adjacent to its inside wall, a flexible belt, and means to draw the belt longitudinally through the drum, the plate supporting the belt; and a pusher over the belt reciprocating toward and from said adjacent drum-wall.

8. The combination of a rotating hollow drum, a conveyer moving longitudinally therethrough adjacent to its interior wall and a pusher reciprocating over the conveyer toward and from said adjacent wall; said pusher being arranged progressively nearer said wall as the conveyer progresses therethrough.

9. The combination of a hollow rotating drum, a conveyer moving longitudinally therethrough adjacent to its interior wall, an element movable over the conveyer and means at each end adapted to actuate it toward and from said wall said actuating means at each end having diverse limits of travel, whereby from one end to the other said element approaches progressively more closely to the wall.

10. Apparatus for forming plastic material comprising a rotating hollow drum, a conveyer moving longitudinally through it adjacent to one wall, an element arranged longitudinally of and movable over the conveyer; a driving means adjacent having revolving pivots of adjustable eccentricity, and connecting rods from said pivots to the ends of said longitudinal element, the eccentricity of said pivots being diverse, whereby one end of said element movable over the conveyer intermittently approaches the drum wall more closely than the other end.

11. Apparatus for forming plastic material comprising a rotating hollow drum, a conveyer moving longitudinally through the drum and a pusher reciprocating over the conveyer toward and from the line where the conveyer and the drum-side are adjacent; the relation of the drum to the area covered by the to and fro travel of said pusher being adjustable; and there being a roller set over the conveyer at the entrance end of the drum for flattening masses of dough about to enter on the conveyer.

Signed by me at Boston, this 23d day of July, 1909.

GUNTHER H. PETRI.

Witnesses:
 EVERETT E. KENT,
 JOSEPH T. BRENNAN.